US010963731B1

(12) United States Patent
Sarkar et al.

(10) Patent No.: US 10,963,731 B1
(45) Date of Patent: Mar. 30, 2021

(54) AUTOMATIC CLASSIFICATION OF ERROR CONDITIONS IN AUTOMATED USER INTERFACE TESTING

(71) Applicant: FMR LLC, Boston, MA (US)

(72) Inventors: Nirupam Sarkar, Westford, MA (US); Kanwar Gaurav Paul, Cary, NC (US); Jensen Joy, North Attleboro, MA (US); Robert Coords, Nashua, NH (US); David Halsey, Northborough, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/069,598

(22) Filed: Oct. 13, 2020

(51) Int. Cl.
| G06K 9/68 | (2006.01) |
| G06K 9/62 | (2006.01) |
| G06F 11/32 | (2006.01) |
| G06K 9/00 | (2006.01) |
| G06F 11/36 | (2006.01) |

(52) U.S. Cl.
CPC .......... *G06K 9/6203* (2013.01); *G06F 11/327* (2013.01); *G06F 11/3688* (2013.01); *G06F 11/3692* (2013.01); *G06K 9/00456* (2013.01); *G06K 9/00463* (2013.01); *G06K 9/6212* (2013.01); *G06K 9/6218* (2013.01)

(58) Field of Classification Search
None
See application file for complete search history.

(56) References Cited

U.S. PATENT DOCUMENTS

| 7,836,346 | B1 * | 11/2010 | Davidov | ............. G06F 11/3692 |
| | | | | 714/38.1 |
| 8,010,500 | B2 | 8/2011 | Chun et al. | |
| 8,161,399 | B2 * | 4/2012 | Kannan | ................... G06F 9/451 |
| | | | | 715/764 |
| 8,850,305 | B1 | 9/2014 | Kent | |
| 9,298,598 | B2 * | 3/2016 | Fryc | ..................... G06F 11/3688 |
| 9,424,167 | B2 * | 8/2016 | Lee | ..................... G06F 3/04842 |
| 10,235,192 | B2 * | 3/2019 | Hall | ..................... G06F 11/0715 |
| 10,387,292 | B2 * | 8/2019 | Budurean | ........... G06F 11/3688 |
| 2011/0231823 | A1 | 9/2011 | Fryc et al. | |
| 2015/0339213 | A1 | 11/2015 | Lee et al. | |
| 2018/0300225 | A1 | 10/2018 | Topholt et al. | |
| 2018/0370029 | A1 * | 12/2018 | Hall | ........................ G06F 9/451 |
| 2019/0227917 | A1 * | 7/2019 | Henry | ................. G06F 11/3664 |
| 2019/0384699 | A1 | 12/2019 | Arbon et al. | |
| 2020/0034279 | A1 | 1/2020 | Shivam et al. | |

OTHER PUBLICATIONS

Lelli et al., "Classifying and qualifying GUI defects." In 2015 IEEE 8th International Conference on Software Testing, Verification and Validation (ICST), pp. 1-10. IEEE, 2015. (Year: 2015).*

* cited by examiner

*Primary Examiner* — Feng Niu

(74) *Attorney, Agent, or Firm* — Proskauer Rose LLP

(57) ABSTRACT

Methods and apparatuses are described for automatic classification of error conditions in automated user interface testing. A server receives an image file corresponding to a current user interface (UI) view of a software application under test. The server analyzes the image file to identify error conditions that exist in the current UI view. The server assigns a classification to the image file according to one or more error types based upon the error conditions identified in the current UI view. The server transmits a notification message to one or more remote computing devices, the notification message comprising the image file and the classification assigned to the image file.

30 Claims, 9 Drawing Sheets

AUTOMATIC CLASSIFICATION OF ERROR CONDITIONS IN AUTOMATED USER INTERFACE TESTING

TECHNICAL FIELD

This application relates generally to methods and apparatuses, including computer program products, for automatic classification of error conditions in automated computer software user interface (UI) testing.

BACKGROUND

Debugging of errors and failures in user interface (UI) automation scripts is a time-intensive process that negatively affects the productivity of software quality assurance (QA) testing teams. Often, such teams may encounter thousands of test automation script failures every week, each of which must be individually debugged and classified by automation engineers (because they all represent potential application defects). The cost to classify these failures is significant, both in terms of engineer time and corresponding cost in resources While automation engineers attempt to classify and resolve all these failures each week, the time commitment necessary to complete this task (in addition to their normal responsibilities supporting releases) makes classifying every failure each week a rare occurrence. While it costs a significant amount of time and money to determine the root cause of these failures, the cost of not classifying one of these failures is even more severe. As the script continues to fail week after week, the opportunity is lost to provide meaningful feedback to development and business partners on why that script is failing, including missing opportunities to identify environment/service outages and intermittent application defects. Additionally, as automation becomes more prevalent, the number of executed and failing scripts will increase, only compounding the problem.

SUMMARY

Therefore, methods and systems are needed for automated computer software user interface (UI) testing that enables advanced computing techniques, such as computer vision and image processing, optical character recognition, and text-based classification, to automatically analyze images of UI screens captured during software application testing, identify any UI errors present in the images, categorize the underlying UI errors, and notify appropriate development and/or QA teams to provide an efficient way to detect and address such errors without relying on large amounts of development time devoted to such work—thereby enabling engineers and developers to spend resources on other projects. The techniques described herein advantageously provide for the automatic classification of UI script failures into one of several categories—such as application defect, environment error, data issue, and script issue. Errors classified as application defect or environment error can be assigned to development teams very quickly for remediation. Errors classified as data issues can be addressed by automation engineers because of their expertise in understanding a potential root cause of the error and the specific piece of data that needs to be changed to ameliorate the error. Errors classified as script issues can also be addressed by automation engineers, resulting in reduced debugging time by eliminating the other potential causes. Finally, the methods and systems beneficially allow for sub-classification of errors, in order to provide more detailed root causes for failures in each of these categories.

The invention, in one aspect, features a system for automatic classification of error conditions in automated user interface testing. The system comprises a server computing device that has a memory for storing computer-executable instructions and a processor that executes the computer-executable instructions. The server computing device receives an image file corresponding to a current user interface view of a software application under test. The server computing device analyzes the image file to identify one or more error conditions that exist in the current user interface view. As a first error condition, the server computing device determines that the current user interface view comprises a blank user interface view. As a second error condition, the server computing device detects a graphical element in the current user interface view, classifies the detected graphical element based upon at least one of an orientation of the detected graphical element or a shape of the detected graphical element, captures a portion of the image file that comprises the detected graphical element and a text segment in proximity to the detected graphical element, and analyzes the text segment in the captured portion of the image file to determine an error associated with the text segment. As a third error condition, the server computing device determines that a header portion of the current user interface view does not include a predefined image. As a fourth error condition, the server computing device detects a presence of an empty area in a portion of the current user interface view. As a fifth error condition, the server computing device extracts a corpus of text from at least a portion of the current user interface view and analyzes the extracted corpus of text to identify one or more text segments that indicate an error. The server computing device assigns a classification to the image file according to one or more error types based upon the one or more error conditions identified in the current user interface view. The server computing device transmits a notification message to one or more remote computing devices, the notification message comprising the image file and the classification assigned to the image file.

The invention, in another aspect, features a computerized method of automatic classification of error conditions in automated user interface testing. A server computing device receives an image file corresponding to a current user interface view of a software application under test. The server computing device analyzes the image file to identify one or more error conditions that exist in the current user interface view. As a first error condition, the server computing device determines that the current user interface view comprises a blank user interface view. As a second error condition, the server computing device detects a graphical element in the current user interface view, classifies the detected graphical element based upon at least one of an orientation of the detected graphical element or a shape of the detected graphical element, captures a portion of the image file that comprises the detected graphical element and a text segment in proximity to the detected graphical element, and analyzes the text segment in the captured portion of the image file to determine an error associated with the text segment. As a third error condition, the server computing device determines that a header portion of the current user interface view does not include a predefined image. As a fourth error condition, the server computing device detects a presence of an empty area in a portion of the current user interface view. As a fifth error condition, the server computing device extracts a corpus of text from at least a portion of the current user interface view and analyzes the extracted corpus of text to identify one or more text segments that indicate an error. The server computing device assigns a classification to the image file according to one or more error types based upon the one or more error conditions identified in the current user interface view. The server computing device transmits a notification message to one or more remote computing devices, the notification message comprising the image file and the classification assigned to the image file.

Any of the above aspects can include one or more of the following features. In some embodiments, determining that the current user interface view comprises a blank user interface view comprises: generating, by the server computing device, a histogram of color values in the image file; and determining, by the server computing device, that the current user interface view comprises a blank user interface view based upon the histogram of color values. In some embodiments, detecting a graphical element in the current user interface view comprises: applying a feature extraction algorithm to the image file to detect the graphical element; and verifying the graphical element once detected by analyzing one or more visual properties of the detected graphical element. In some embodiments, the feature extraction algorithm is a generalized Hough Transform algorithm. In some embodiments, the one or more visual properties of the detected graphical element include a location of the detected graphical element and an opacity of the detected graphical element.

In some embodiments, detecting a graphical element in the current user interface view comprises: retrieving a plurality of template images, wherein each template image corresponds to the graphical element at a different orientation; traversing the image file using the plurality of template images to generate a plurality of match scores; and detecting the graphical element using the plurality of match scores. In some embodiments, traversing the image file using the plurality of template images to generate a plurality of match scores comprises, for each template image: aligning the template image with a portion of the image file at each of a plurality of different sets of pixel coordinates; for each set of coordinates: comparing the template image with the portion of the image file at the corresponding set of pixel coordinates, and generating a match score for the corresponding set of pixel coordinates based upon the comparison. In some embodiments, comparing the template image with the portion of the image file at the corresponding set of pixel coordinates comprises: comparing a value of one or more pixels in the template image to a value of one or more pixels in the portion of the image file at the corresponding set of pixel coordinates. In some embodiments, detecting the graphical element using the plurality of match scores comprises: determining a maximum match score of the plurality of match scores; and selecting the portion of the image file at the set of pixel coordinates that corresponds to the maximum match score.

In some embodiments, capturing a portion of the image file that comprises the detected graphical element and a text segment in proximity to the detected graphical element comprises: identifying a region of interest in the image file based upon a location of the detected graphical element in the current user interface view; and capturing the region of interest in the image file as a sub-image. In some embodiments, analyzing the text segment in the captured portion of the image file to determine an error associated with the text segment comprises: extracting the text segment from the sub-image; and searching an error database using the extracted text segment to determine an error associated with the text segment.

In some embodiments, determining that a header portion of the current user interface view does not include a predefined image comprises: generating a histogram of gray values in a portion of the image file corresponding to a header portion of the current user interface view; comparing the histogram of gray values in the portion of the image file to a histogram of gray values in the predefined image; and determining that the header portion does not include the predefined image based upon the histogram comparison. In some embodiments, detecting a presence of an empty area in a portion of the current user interface view comprises: partitioning the image file into a plurality of pixel matrices; determining, for each pixel matrix, whether all of the pixels in the pixel matrix have a single color value; and identifying at least one of a size, a shape, or a location of the pixel matrices where all of the pixels have a single value. In some embodiments, extracting a corpus of text from at least a portion of the current user interface view and analyzing the extracted corpus of text to identify one or more text segments that indicate an error comprises: identifying a body portion of the current user interface view based upon a histogram of gray values in the image file; capturing a portion of the image file corresponding to the body portion of the current user interface view; removing noise from the captured portion of the image file; and extracting the corpus of text from the captured portion of the image file using optical character recognition. In some embodiments, the server computing device compares the extracted corpus of text to one or more text segments in an error database to determine that the corpus of text indicates an error.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
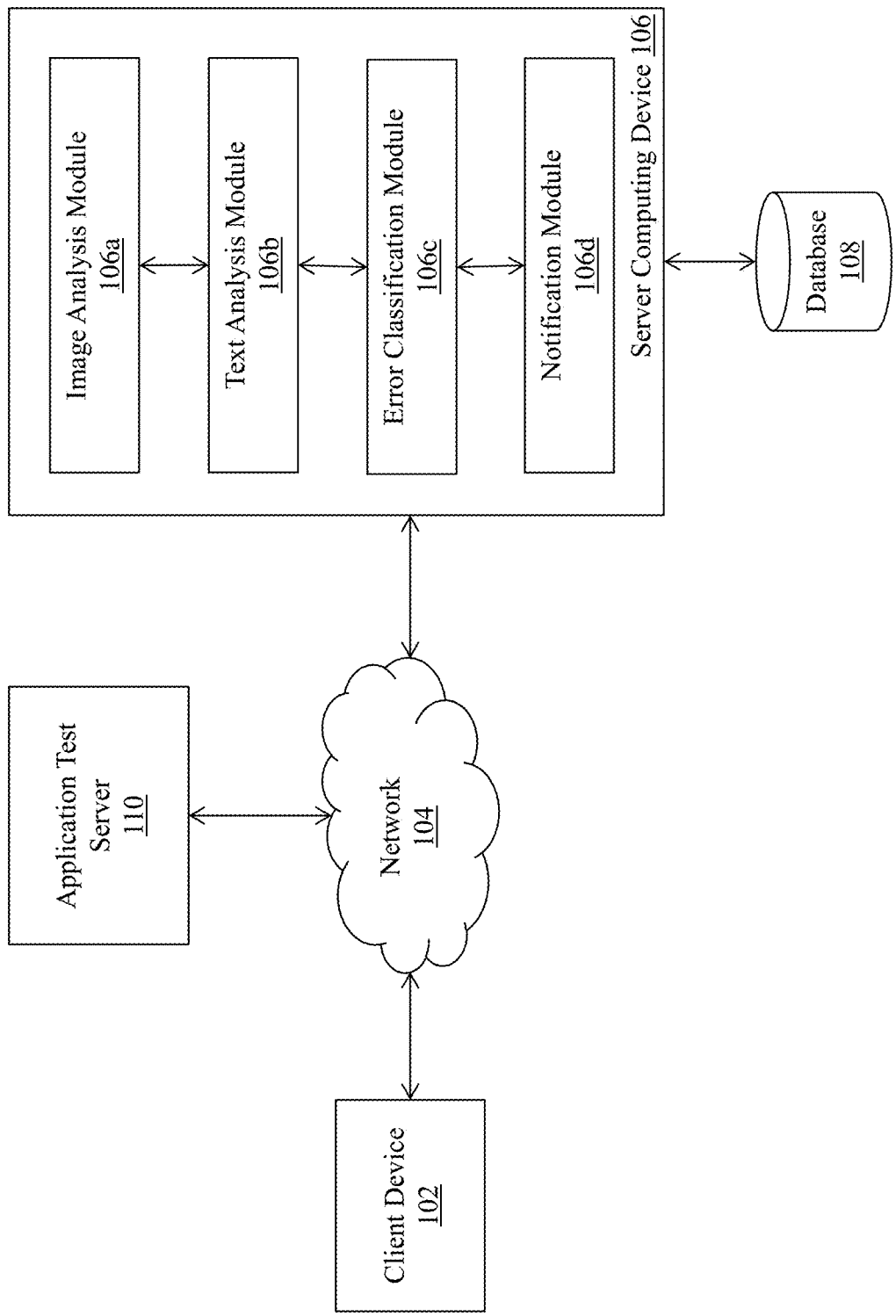
FIG. 1 is a block diagram of a system for automatic classification of error conditions in automated user interface testing.

FIG. 1 is a block diagram of a system 100 for automatic classification of error conditions in automated user interface testing. The system 100 includes a client computing device 102, a communications network 104, a server computing device 106 with an image analysis module 106a, a text analysis module 106b, an error classification module 106c, and a notification module 106d, a database 108, and an application test server 110.

The client computing device 102 uses software and circuitry (e.g., processor, memory) to execute applications and to communicate with the server computing device 106 and the application test server 110 via the communication network 104 (e.g., using software installed on the device to connect to the Internet via communication circuitry, such as a network interface card or WiFi antenna) for the purposes of automatic classification of error conditions in automated user interface testing as described herein. Example client computing devices 102 can include, but are not limited to, a desktop computer, laptop computer, tablet, smartphone, mobile device or other similar types of computing devices.

The communication network 104 enables components of the system 100 to communicate with each other using a packet-based protocol (e.g., IP). The network 104 may be a local network, such as a LAN, or a wide area network, such as the Internet. In some embodiments, the network 104 is comprised of several discrete networks and/or sub-networks (including related routing, load balancing, and traffic metering hardware).

The server computing device 106 is a combination of hardware and software modules that includes specialized hardware and/or software modules that execute on a processor and interact with memory modules of the server computing device 106, to receive data from the database 108, to transmit data to the database 108, and to communicate with the other devices of the system 100 (e.g., client device 102, application test server 110) in order to perform functions for automatic classification of error conditions in automated user interface testing as described herein. The server computing device 106 includes an image analysis module 106a, a text analysis module 106b, an error classification module 106c, and a notification module 106d (as mentioned above) that execute on and/or interact with the processor of the server computing device 106.

In some embodiments, the image analysis module 106a, the text analysis module 106b, the error classification module 106c, and the notification module 106d are specialized sets of computer software instructions programmed onto one or more dedicated processors in the server computing device 106 and can include specifically-designated memory locations and/or registers for executing the specialized computer software instructions. Although the image analysis module 106a, the text analysis module 106b, the error classification module 106c, and the notification module 106d are shown in FIG. 1 as executing within the same server computing device 106, in some embodiments the functionality of the modules 106a-106d can be distributed among a plurality of server computing devices. As shown in FIG. 1, the server computing device 106 enables the image analysis module 106a, the text analysis module 106b, the error classification module 106c, and the notification module 106d to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of the image analysis module 106a, the text analysis module 106b, the error classification module 106c, and the notification module 106d is described in detail below.

The database 108 is a computing device (or in some embodiments, a set of computing devices) coupled to the server computing device 106 and is configured to receive, generate, and store specific segments of data relating to the process of automatic classification of error conditions in automated user interface testing as described herein. In some embodiments, all or a portion of the database 108 can be integrated with the server computing device 106 or be located on a separate computing device or devices. The database 108 can comprise one or more databases configured to store portions of data used by the other components of the system 108, as will be described in greater detail below. An exemplary database 108 is MySQL™ available from Oracle Corp. of Redwood City, Calif.

The application test server 110 is a computing device that provides one or more test automation software tools (e.g., Sahi™, Selenium™, or other similar tools that provide functionality for capturing a screenshot of a user interface) accessible by software installed at the client computing device 102 for the execution of automation test scripts (e.g., code files that automatically execute features and functions of a software application under test at the application test server 110). An exemplary software application under test can be a web-based application that is accessed by the client computing device 102 via a browser (e.g., Chrome™ Safari™, or other similar web browsers), although other types of software applications under test can be contemplated within the scope of invention. In one example, the application test server 110 can connect to each of the client computing device 102 via an HTTP session in a browser to receive commands for the execution of particular test scripts and to provide application data and test results in response to the requests.

In one embodiment, a user at client computing device 102 issues a command to application test server 110 for the execution of one or more automation test scripts against, e.g., one or more software applications being tested. The application test server 110 then executes the test scripts to activate functionality of the software applications under test and capture corresponding outcomes and resulting files from execution of the test scripts (e.g., logs, image screenshots of the application UI, message notifications, etc.). In some embodiments, the application test server 110 can transmit files that result from test execution to the server computing device 106 and/or the database 108 for storage or processing as will be explained herein.

Figure 2:
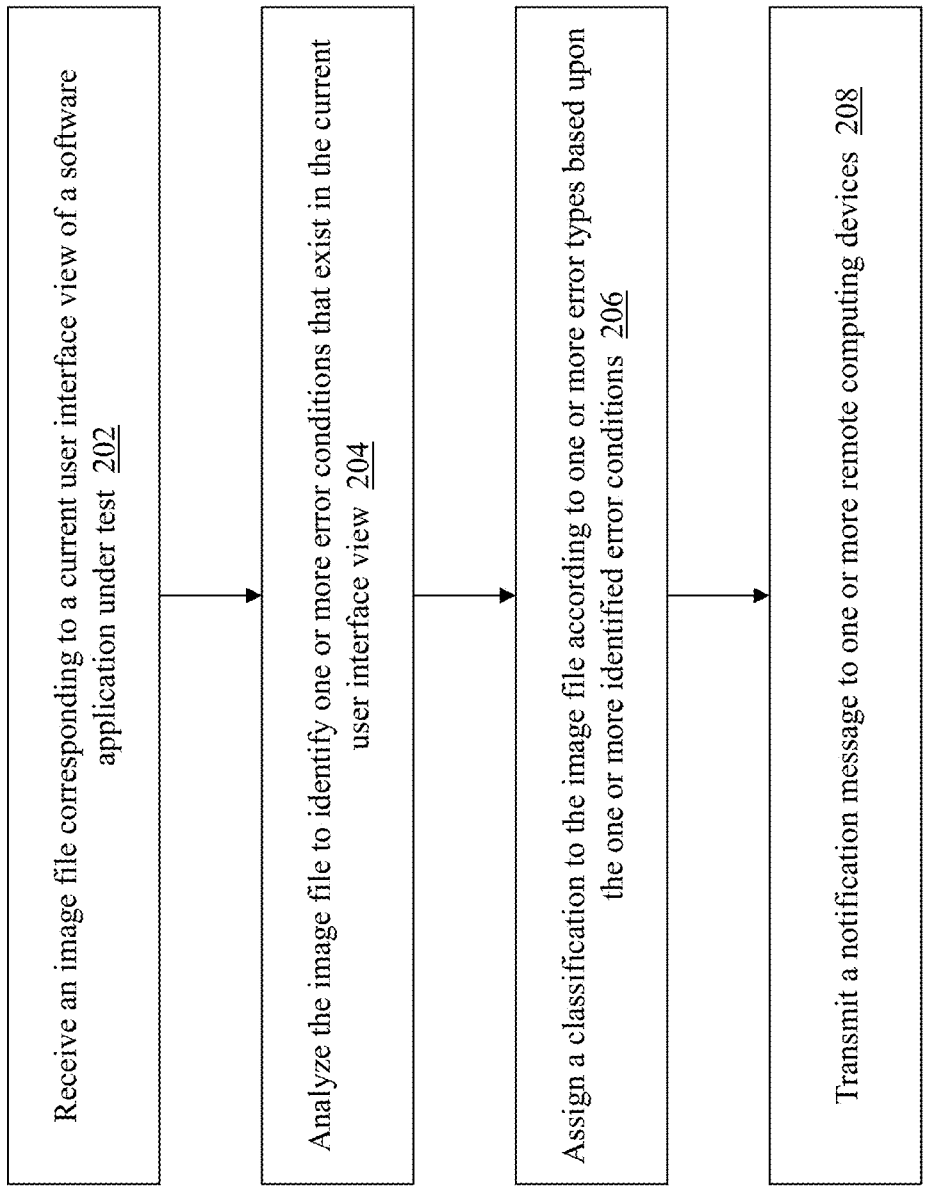
FIG. 2 is a flow diagram of a computerized method of automatic classification of error conditions in automated user interface testing.

FIG. 2 is a flow diagram of a computerized method 200 of automatic classification of error conditions in automated user interface testing, using the system 100 of FIG. 1. As explained above, to initiate execution of one or more automation test scripts, the client computing device 102 can issue one or more commands to the application test server 110, which in response executes the test scripts against one or more software applications being tested and captures data associated with the test execution. For example, the application test server 110 can capture one or more images (e.g., .JPG, .GIF, .PNG files) of a user interface screen of the tested software application at various points during execution of the text scripts. Screenshots of exemplary UI images are provided as FIGS. 4A-4D herein, and will be referenced in detail below. The application test server 110 can store these images in database 108 for retrieval by the server computing device 106 and/or the application test server 100 can transmit these images (e.g., in batch or in real-time) to the server computing device 106 for analysis.

Figure 3:
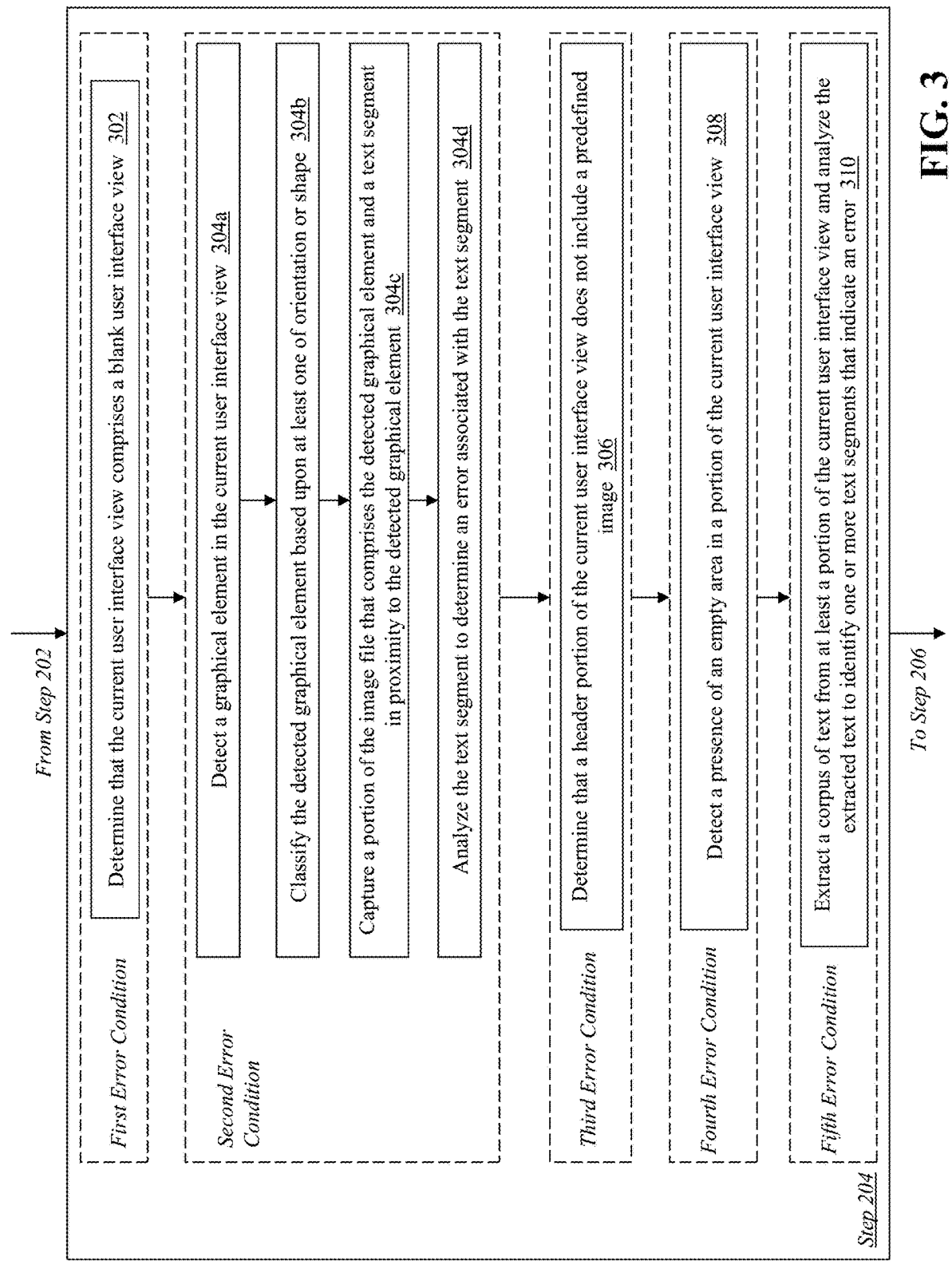
FIG. 3 is a detailed flow diagram of a computerized method of detecting error conditions in automated user interface testing.

The server computing device 106 receives (202) an image file corresponding to a current user interface view of a software application test, e.g., from application test server 110. As mentioned above, the server computing device 106 can receive images of UI screenshots from application test server 110 during or after the application test server 110 executes one or more automation test scripts against a software application being tested. The server computing device 106 analyzes (204) the received image file(s) to identify one or more error conditions that exist in the current user interface view. FIG. 3 is a detailed flow diagram of a computerized method 300 of detecting error conditions in automated user interface testing, corresponding to step 204 of FIG. 2. As shown in FIG. 3, the server computing device 106 analyzes each UI image using a plurality of error conditions to determine whether the UI image comprises at least one of the error conditions (and thereby indicating that an error or failure has likely occurred in the automation test script). While the error conditions shown in FIG. 3 are enumerated first through fifth, this is an exemplary configuration and it should be appreciated that the error conditions can be evaluated in any order. In some embodiments, the captured UI image is converted from color to grayscale before the image is processed for blank user interface view detection as described below.

Figure 4A:
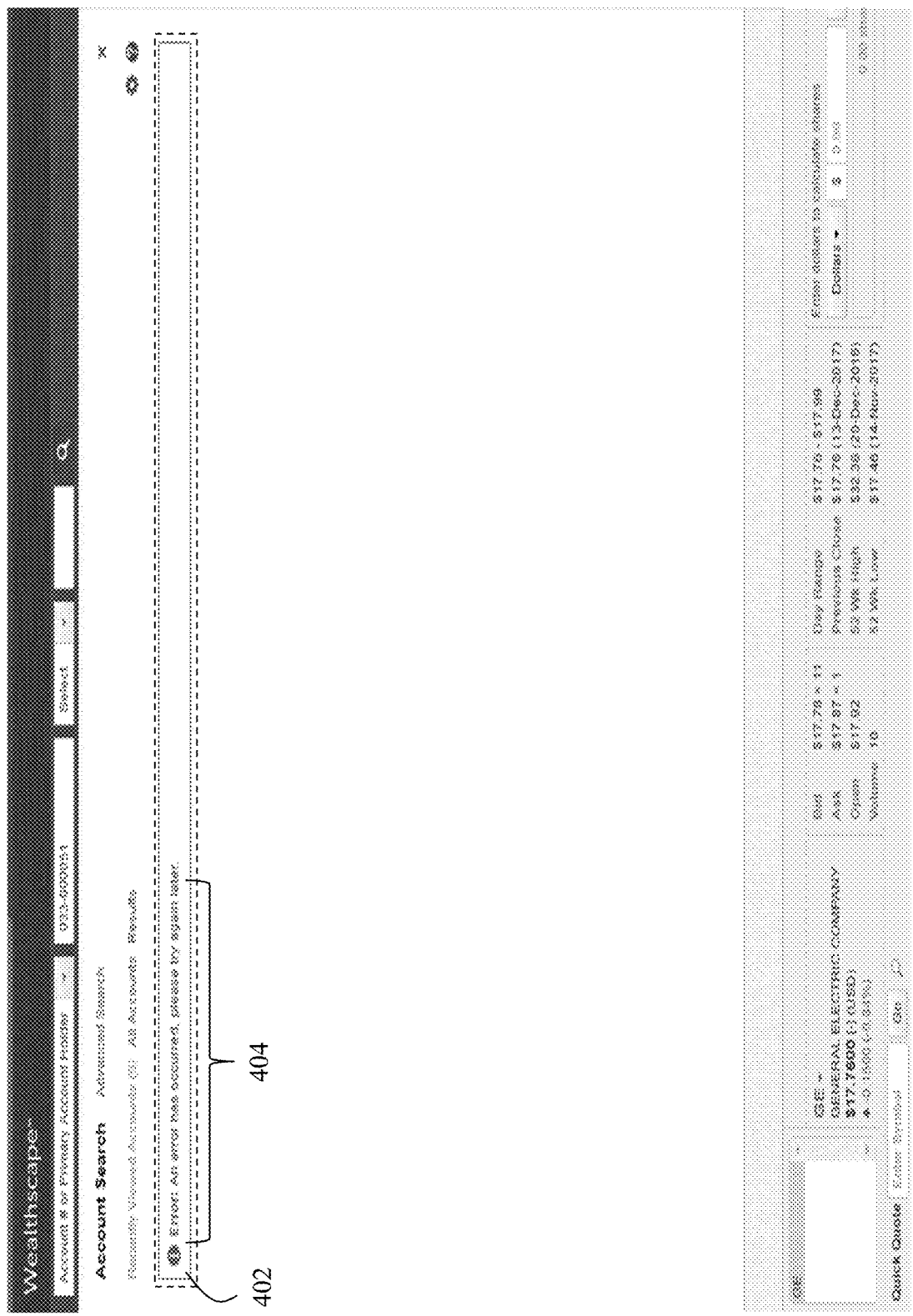
FIG. 4A is a screenshot of an exemplary user interface view that is comprised mostly of a single color value.

As a first error condition, the image analysis module 106a determines (302) that the current user interface view comprises a blank user interface view. For example, an error may occur in the test script that causes the user interface to be entirely, or mostly, blank. FIG. 4A is a screenshot of an exemplary user interface view that is comprised mostly of a single color value (i.e., white). In this context, it should be appreciated that blank generally means that the image comprises mostly one color value (e.g., one gray value in a black-and-white image) that does not necessarily have to be white. In order to determine whether the current user interface view is blank, the image analysis module 106a creates a histogram of color values corresponding to the image and analyzes the histogram to determine whether to classify the image as blank. In one example, the image analysis module 106a captures a color value (e.g., RGB value) for each pixel in the image and aggregates the color values into a histogram (e.g., a representation of the color values, such as a matrix or a chart). For example, the image analysis module 106a can assign each pixel to a bin that corresponds to a particular color value (or range of color values), and then count the number of pixels in each bin to determine whether the image is completely or mostly comprised of a single color. It should be appreciated that for a color image, the image analysis module 106a can generate a color histogram and for a black-and-white or grayscale image, the image analysis module 106a can generate a grayscale histogram.

Figure 5:
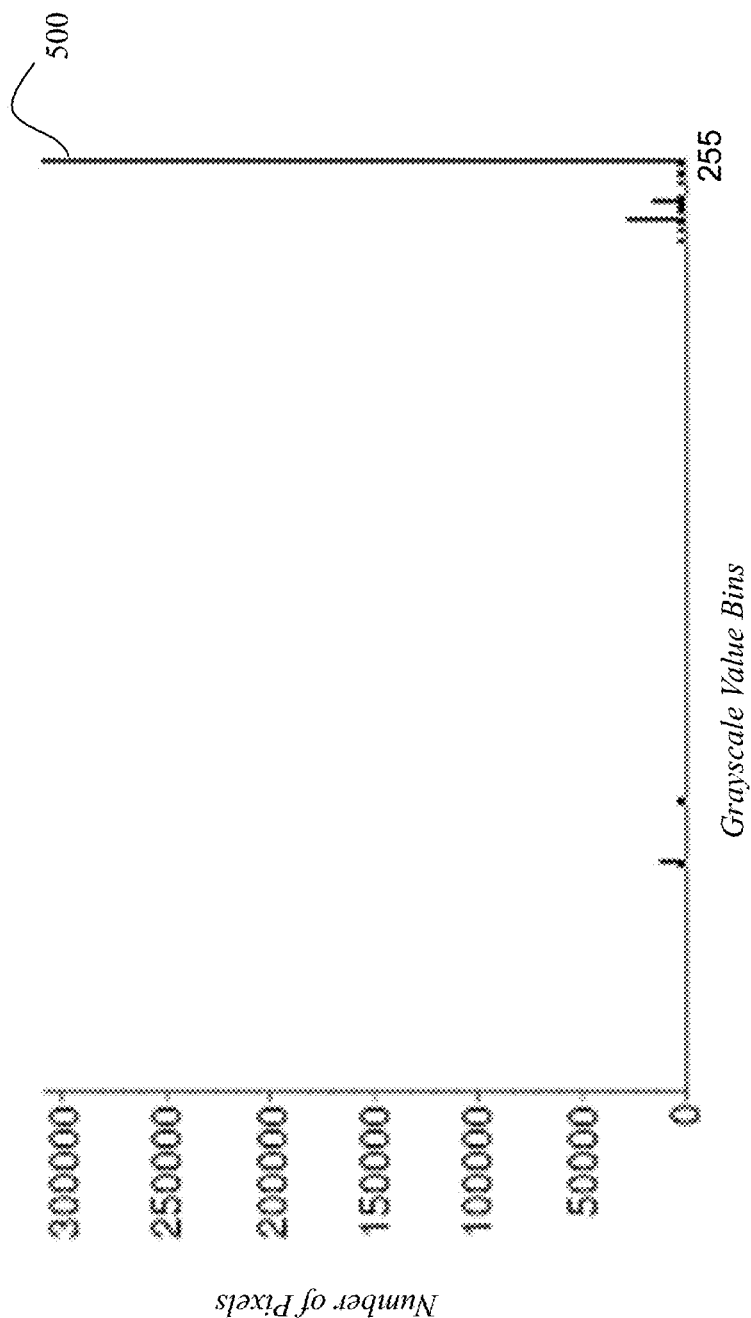
FIG. 5 is an exemplary grayscale histogram generated from the image of FIG. 4A.

FIG. 5 is an exemplary grayscale histogram generated from the UI image of FIG. 4A. As shown in FIG. 5, the histogram comprises a chart that shows the number of pixels in the UI image that are assigned to a certain grayscale value bin (where 0=black and 255=white). The large majority of pixels (i.e., over 300,000) in the UI image have a color value that is assigned to bin 255—meaning that most of the pixels are white. It should be appreciated that in some cases, the blank image may not have all white pixels (or any white pixels)—instead, the blank image can comprise another color value (e.g., gray) all over. However, the blank image will comprise a single color value based upon the conversion of the image to grayscale from color as mentioned previously. With the understanding that the software application under test should not produce any UI screens that comprise such a significant number of white (or single color) pixels, the image analysis module 106a can determine that, based on the distribution of color values in the histogram, the UI image represents an error condition and thus should be identified for the QA and testing teams.

In some embodiments, once the server computing device 106 determines that the current UI view is a blank view, the server computing device 106 does not continue analyzing the UI image file against each of the subsequent error conditions (e.g., second through fifth in FIG. 3)—but instead provides the UI image file and a data value that indicates the first error condition was met (such as a first error condition flag set to 1) to the error classification module 106c. The error classification module 106c of the server computing device assigns (206) a classification to the image file according to one or more error types based upon the one or more identified error conditions. For example, the error classification module 106c correlates the error condition data value received from the server computing device 106 against, e.g., a table or list of error types in order to classify the UI image according to one or more of the error types. For example, the error classification module 106c can determine that a blank user interface view error condition corresponds to an 'environment error-blank image' error type (and/or a particular error code value, such as CODE: 310). The notification module 106d of the server computing device receives the image file and error classification from the error classification module 106c and transmits (208) a notification message to one or more remote computing devices (e.g., client computing device 102), where in some embodiments the notification message includes the image file of the UI that comprises the error condition, and the corresponding error classification assigned to the image file. The notification module 106d then generates a message that is transmitted to, e.g., the client computing device 102 to indicate to a user of the device that an error has occurred. In some embodiments, the notification module 106d stores the UI image file and the error type in database 108, so that developers and testers can later review the information.

In other embodiments, even after determining that the current UI view is a blank view, the server computing device 106 can continue analyzing the UI image file against the other error conditions to determine whether any other error conditions exist in the UI image. The server computing device 106 can classify the UI image according to each of the other error conditions that are detected and transmit this information to one or more remote computing devices as explained above.

Continuing with FIG. 3, an automation test script may cause a UI error in the software application under test that is represented by a graphical element in the UI. For example, the software application may display an error icon (e.g., a red triangle with an exclamation point inside) accompanied by certain error message text in proximity to the icon. In another example the software application may display a progress indicator (such as a spinner or hourglass) to show that certain functionality of the software application is still attempting to load or execute—and that due to an error, is unable to complete. In the above cases, as a second error condition, the server computing device 106 can detect the graphical element (and any associated error text) and analyze the graphical element and text to determine that the error condition exists.

For the second error condition, the image analysis module 106*a* first detects (304*a*) a graphical element in the current interface view. Depending on the type of graphical element, the image analysis module 106*a* can perform different image analysis and object recognition techniques. When the graphical element is a progress indicator, such as a spinner, it should be appreciated that the progress indicator changes its appearance over time—as a result, when the UI image is captured by the application test server 110, the progress indicator can be in one of a number of different orientations or visual statuses. Therefore, the image analysis module 106*a* can perform one or more computer vision techniques to detect the progress indicator no matter which orientation or visual appearance is represented in the UI image.

In one example, the image analysis module 106*a* executes a generalized Hough Transform algorithm on the UI image to identify locations where the progress indicator exists in the image. The Hough Transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform. Exemplary generalized Hough Transform algorithms are described in en.wikipedia.org/wiki/Generalised_Hough_transform and Ballard, D. H., "Generalizing the Hough transform to detect arbitrary patterns," *Pattern Recognition,* 13(2):111-122, 1981—both of which are incorporated herein by reference. In some embodiments, the generalized Hough Transform technique is useful in situations where the progress indicator is a thin annular ring shape.

In another example, the image analysis module 106*a* performs a template matching process to detect the location and/or orientation of the progress indicator. In some embodiments, the template matching process uses cross correlation or sum of absolute differences to determine a match. One method of template matching uses an image mask (template), tailored to a specific feature of the search image, which the image analysis module 106*a* wants to detect. The image analysis module 106*a* traverses the UI image from top to bottom (e.g., starting at coordinates 0, 0, or the left-hand top corner, proceeding across to the top right corner, then down and across each row, ending in the bottom right corner), and matching the image template to each coordinate position in the image to get a cross correlation output value (also called a match score). The cross correlation output value will be highest at places where the image matches the template.

For example, the image analysis module 106*a* can select a plurality of template images, where each template image corresponds to the graphical element at a different orientation (e.g., a spinner at each of several different degrees of rotation). The image analysis module 106*a* can traverse the UI image file using each of the plurality of template images to generate a plurality of match scores. As mentioned above, at each position in the image, the module 106*a* compares the template to the image and generates a match score. After completion of the traversal, the module 106*a* can select the portion of the UI image as matching the template at the location with the maximum match score.

In some embodiments, the template matching technique is normally implemented by first picking out a part of the search image to use as a template:

Search image $S(x, y)$, where $(x, y)$ represent the coordinates of each pixel in the search image.

The template $T(x_t, y_t)$, where $(x_t, y_t)$ represent the coordinates of each pixel in the template.

The image analysis module 106*a* then moves the center of the template $T(x_t, y_t)$ over each $(x, y)$ point in the UI image and calculates the sum of products between the coefficients in $S(x, y)$ and $T(x_t, y_t)$ over the whole area spanned by the template. As all possible positions of the template with respect to the search image are considered, the position with the highest score (based upon cross correlation or sum of absolute differences) is generally a match for the template—indicating the position of the progress indicator in the UI image. The template matching algorithm is useful in detecting various types of progress indicators, including spoked spinners (such as the one shown in FIG. 6). It should be appreciated that the spinners can appear in the UI image in any of a number of different states or orientations—for example, the spoked spinner can be captured in an orientation with the leading edge of the spinner (i.e., the darkest spoke) at any of the various positions (e.g., 12 o'clock, 3 o'clock, 6 o'clock, etc.) depending upon the state of the spinner at the time the image is captured. Identifying the spinner when it can be in any of a number of different orientations is challenging for the system 100 to accomplish—therefore, the template matching process described above advantageously provides for efficient and accurate object identification.

Figure 6:
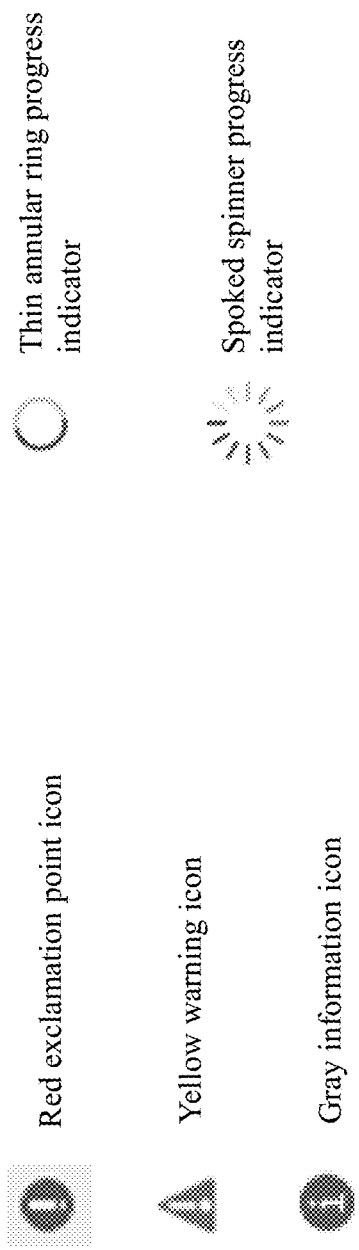
FIG. 6 depicts exemplary graphical elements detected by the system of FIG. 1.

The above template matching technique can also be used for detecting other types of graphical elements, such as a red exclamation point icon, a yellow alert icon, and a gray information icon. Examples of these icons are shown in FIG. 6. The red exclamation point icon has a circular shape with an exclamation point inside, the yellow warning icon has a triangular shape with an exclamation point inside, and the gray information icon has a circular shape with a lowercase i inside. The image analysis module 106*a* can detect each of these graphical elements based upon shape and/or orientation through template matching.

Once the image analysis module 106*a* has detected (304*a*) a graphical element in the current interface view, the image analysis module 106*a* classifies (304*b*) the detected graphical element based upon at least one of orientation or shape. As indicated above, each of the graphical elements has a distinct visual appearance, including a shape and one or more other features—such as a symbol, a letter, or other appearance elements (e.g., spokes). Based upon the template used to match the graphical element, the image analysis module 106*a* can classify the detected graphical element as belonging to a particular category of errors—e.g., red exclamation point icon would be classified in a first category, yellow warning icon would be classified in a second category, and so on. Next, the image analysis module 106*a* captures (304*c*) a portion of the UI image file that comprises the detected graphical element and a text segment in proximity to the detected graphical element, as a sub-image. An example of a UI image that has a detected graphical element and an associated text segment is shown in FIG. 4A. There, the red exclamation point 402 appears in the UI image, along with a text string 404 that reads "Error: An error has occurred, please try again later." The image analysis module 106*a* crops the portion of the image file (in the dotted line box), determines the location of the text segment and extracts the text in the text segment.

In some instances, the UI image may be degraded or low quality when captured by the application test server 110—which lessens the accuracy of computerized techniques such as optical character recognition (OCR) to extract text in the image. In these scenarios, the image analysis module 106a can perform one or more image processing functions (such as sharpening, filtering, scaling, changing contrast, binarization, etc.) on the entire UI image, or just the cropped portion of the image, to enhance the detectability of the text in the image. Then, the image analysis module 106a can utilize an OCR technique to extract the text from the image into a text string variable.

The image analysis module 106a can transmit the UI image, the error category of the graphical element, and the extracted text string to the error classification module 106c, which processes the data to classify the UI image according to one or more error types based upon the graphical element and text string. For example, the error classification module 106c can determine that the graphical element comprises a red exclamation point error, then retrieve a list of error messages that may be associated with red exclamation point errors—such as the following examples:

Script Issues
"No changes to save" (CODE: 111)
"Export Name should be unique" (CODE: 112)
Environment Errors
"Service is temporarily unavailable" (CODE: 341)
"An error occurred, Please try again later" (CODE: 342)
"Error: a technical error has occurred" (CODE: 343)
"Requested action could not be performed" (CODE: 344)
Data Issues
"Account access blocked for security purposes" (CODE: 411)
"You are not authorized to access this function" (CODE: 412)
"The client name already exists" (CODE: 413)
"The Userid or Password is not valid" (CODE: 414)

The error classification module 106c can match the extracted text string to one or more of the messages in the list of error messages to determine which error type occurred in the UI image. In some embodiments, the extracted text string may comprise a truncated form of the entire error message (e.g., due to issues in the UI with displaying the entire error message). In these cases, the error classification module 106c can utilize a multi-gram fuzzy matching algorithm to determine which error type occurred. An exemplary fuzzy matching algorithm that can be used by the module 106c is the Fuzzywuzzy Python library available from pypi.org/project/fuzzywuzzy/. The error classification module 106c can classify the UI image based upon the error type.

The notification module 106d of the server computing device 106 receives the image file and error classification from the error classification module 106c and transmits (208) a notification message to one or more remote computing devices (e.g., client computing device 102), where in some embodiments the notification message includes the image file of the UI that comprises the error condition, and the corresponding error classification assigned to the image file. The notification module 106d then generates a message that is transmitted to, e.g., the client computing device 102 to indicate to a user of the device that an error has occurred. In some embodiments, the notification module 106d stores the UI image file and the error type in database 108, so that developers and testers can later review the information.

Figure 4B:
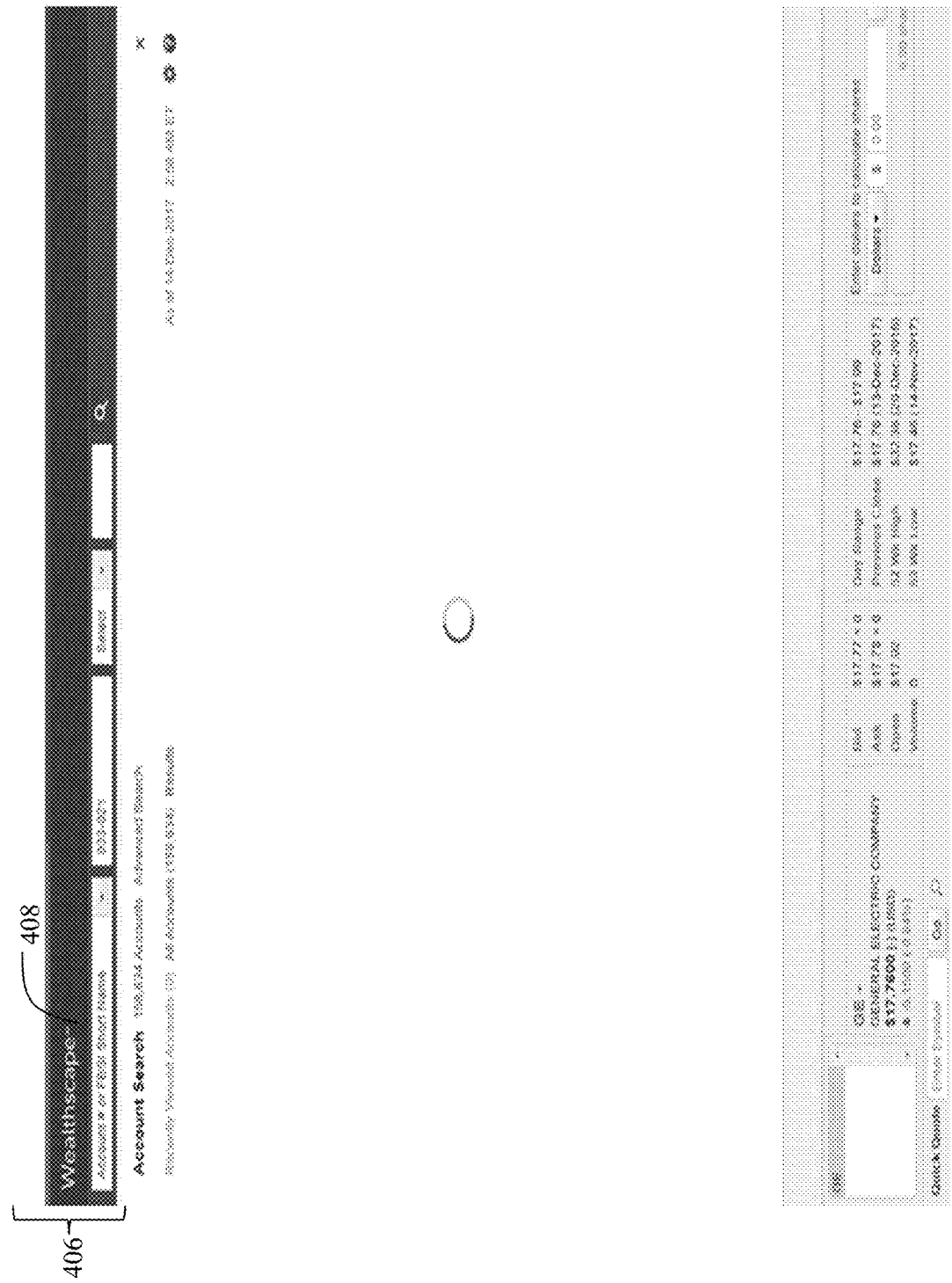
FIG. 4B is a screenshot of an exemplary user interface view that includes a header section and associated header image.

Turning back to FIG. 3, as a third error condition, the image analysis module 106a determines (306) that a header portion of the current user interface view does not include a predefined image. As can be appreciated, certain types of browser-based software applications can comprise a header section with a logo, menu, or other type of image (e.g., branding) that identifies the application or a provider of the application. A screenshot of an exemplary UI with a header section 406 and an associated image 408 (e.g., "Wealth-scape") is shown in FIG. 4B. The image analysis module 106a can analyze the UI image to determine whether that header image does not appear in the UI (thus indicating a potential error condition, such as a missing file or failure to load the application).

To analyze the UI image, the module 106a can generate a histogram of gray values (or color values) in a portion of the image file corresponding to the header portion of the current user interface view—using a similar technique as described previously with respect to step 302 of FIG. 3. With the example of FIG. 4B, the module 106a can be configured to select the portion of the image that corresponds to the entire header 406 and/or to only the header image 408 itself (e.g., using preset coordinate values) and generate a histogram of gray values based upon the image portion. Then, the module 106a can compare the histogram of gray values in the portion of the image file to a histogram of gray values that has been pre-generated based upon a reference image. For example, the module 106a can retrieve a histogram of gray values from database 108 that corresponds to the image (and/or the header) that should be present in the UI image. The module 106a can compare the values of each histogram to determine whether they are similar (or match), or if there are significant differences (thus indicating an absence of the header image). In the event that the comparison indicates that the header image does not appear in the captured UI, the image analysis module 106a can set an indicator (such as an error condition flag) and transmit the UI image and the indicator to the error classification module 106c, which can classify the UI image according to one or more error types based upon the indicator. For example, if the header image does not appear in the UI, the error classification module 106c can identify one or more error types from the database 108 based upon the indicator value (e.g., top image not appearing, top menu not appearing). The notification module 106d receives the UI image file and error classification from the error classification module 106c and transmits a notification message to one or more remote computing devices (e.g., client computing device 102), where in some embodiments the notification message includes the image file of the UI that comprises the error condition, and the corresponding error classification assigned to the image file. The notification module 106d then generates a message that is transmitted to, e.g., the client computing device 102 to indicate to a user of the device that an error has occurred. In some embodiments, the notification module 106d stores the UI image file and the error type in database 108, so that developers and testers can later review the information.

Figure 4C:
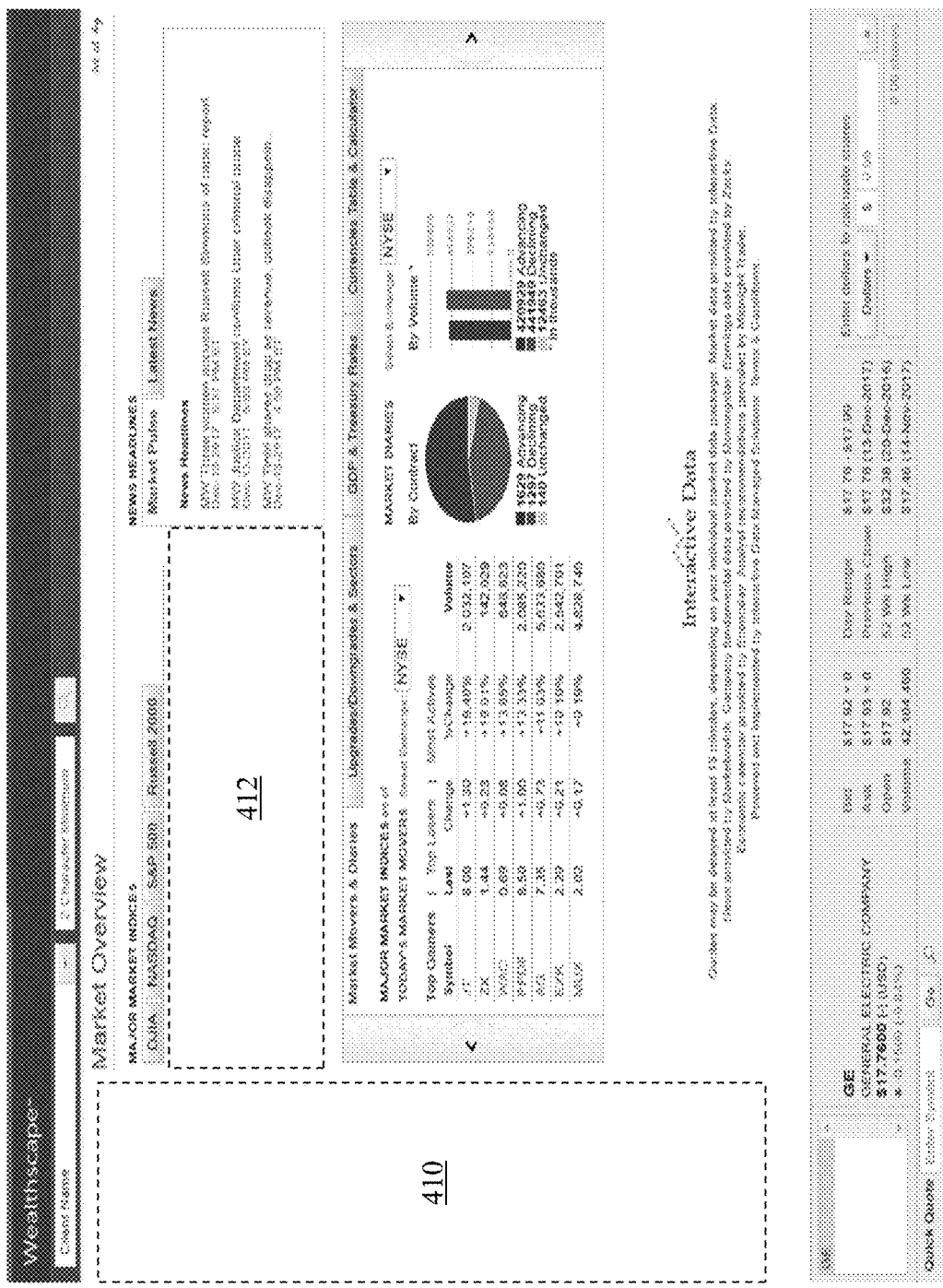
FIG. 4C is a screenshot of an exemplary user interface view that includes an empty area.

Turning back to FIG. 3, as a fourth error condition, the image analysis module 106a can detect (308) a presence of an empty area in a portion of the current user interface view. For example, due to errors such as missing resources or incomplete loading of the application, one or more areas of the UI may be empty. The module 106a can detect these areas and based upon location and/or size of the empty areas, the module 106a can classify the UI image as indicating a certain error condition. FIG. 4C is a screenshot of an exemplary UI that contains a first empty area 410 (e.g., a blank area on the left-hand portion of the UI) and a second empty area 412 (e.g., a blank area in a center portion of the UI). For example, the first empty area 410 may be expected to contain a menu or other information during normal operation of the software application, and the second empty area 412 may be expected to contain a chart or graph relating to certain market index data (e.g., DJIA, NASDAQ, S&P 500, Russell 2000).

To detect the empty area(s), the image analysis module 106a can perform a blob identification algorithm on the UI image. In some embodiments, the module 106a can partition the image file into a plurality of pixel matrices (e.g., section the entire UI image into matrices of 10×10 pixels). Then, the module 106a determines, for each pixel matrix, whether all of the pixels in the pixel matrix have a single color value. For example, as shown in FIG. 4C, the empty area 410 and empty area 412 are entirely white—so all of the pixels in the areas 410 and 412 can have a value of 255, 255, 255 (in RGB color). In some embodiments, a 10×10 pixel matrix that has even one pixel of a different color value would cause the module 106a not to consider the matrix as empty. The module 106a then identifies at least one of a size, a shape, or a location of the pixel matrices in the UI image where all of the pixels have a single color value—thus indicating a contiguous empty area. Depending on the size, shape and/or location, the error classification module 106c can classify the UI image as indicating a specific error condition/error type. The notification module 106d receives the UI image file and error classification from the error classification module 106c and transmits a notification message to one or more remote computing devices (e.g., client computing device 102), where in some embodiments the notification message includes the image file of the UI that comprises the error condition, and the corresponding error classification assigned to the image file. The notification module 106d then generates a message that is transmitted to, e.g., the client computing device 102 to indicate to a user of the device that an error has occurred. In some embodiments, the notification module 106d stores the UI image file and the error type in database 108, so that developers and testers can later review the information.

It should be appreciated that, in some embodiments, the image analysis module 106a can utilize a priority mechanism for blob identification. The priority mechanism enables the module 106a to detect a first empty area in the UI image and then stop the blob identification process, instead of continuing to detect other empty areas in the UI image. For example, in FIG. 4C, the module 106a can section the UI image into a number of matrices and then prioritize which matrices are analyzed first, second, third, etc. If an empty area is found in the first set of matrices (e.g., corresponding to empty area 410), the module 106a can identify the size, shape, location etc. of the empty area and then the error classification module 106c can classify the UI image accordingly—without requiring analysis of the UI image to determine that empty area 412 exists.

Returning to FIG. 3, as a fifth error condition, the image analysis module 106a can extract (310) a corpus of text from at least a portion of the current user interface view and analyze the extracted text to identify one or more text segments that indicate an error. As can be appreciated, in some cases the automation test script and/or software application under test may generate an error message (e.g., in a body portion of the UI) that does not have one or more of the aforementioned graphical elements associated with the message. In such cases, the server computing device 106 is configured to detect the error text and identify an error type associated with the text.

Figure 4D:
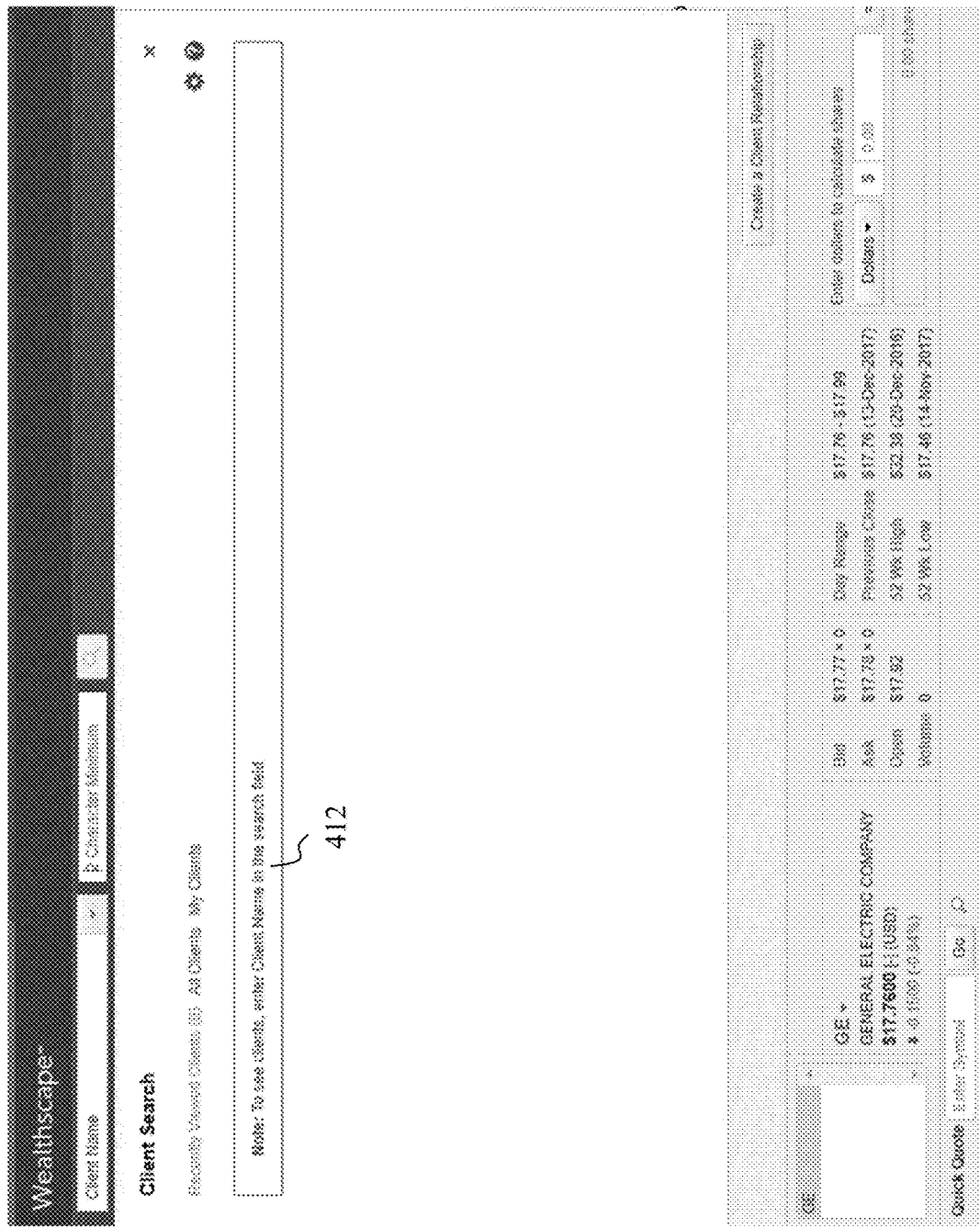
FIG. 4D is a screenshot of an exemplary user interface view with a corpus of text that indicates an error has occurred.

FIG. 4D is a screenshot of an exemplary UI with a corpus of text 412 that indicates an error has occurred. Typically, such errors occur in a body portion of the UI (generally, the lower portion of the UI screen). To detect the corpus of error text, the image analysis module 106a can identify a body portion of the current user interface view based upon, e.g., a histogram of gray values in the image file and/or preset coordinate values For example, the image analysis module 106a can partition the UI image into a header portion and a body portion by selecting portions of the image that correspond to header coordinates and body coordinates, or by generating a histogram of gray values (or color values) for the entire UI image and capturing a portion of the UI image file that corresponds to the body based upon the histogram (e.g., a portion of the image that has more white values can be an indicator of the body portion). In some embodiments, the image analysis module can remove noise from the captured portion of the image file (e.g., filtering, pre-processing, etc.) and further extract the corpus of text from the captured portion of the image file using, e.g., OCR techniques (as explained previously).

Then, the image analysis module 106a can transmit the UI image and/or the body portion of the UI image, and the extracted error text to the error classification module 106c. The error classification module 106c can match the extracted text string to one or more of the messages in a list of error messages to determine which error type occurred in the UI image. In some embodiments, the extracted text string may comprise a truncated form of the entire error message (e.g., due to issues in the UI with displaying the entire error message). In these cases, the error classification module 106c can utilize a multi-gram fuzzy matching algorithm (e.g., Fuzzywuzzy) to determine which error type occurred. The error classification module 106c can classify the UI image based upon the error type.

The notification module 106d of the server computing device 106 receives the image file and error classification from the error classification module 106c and transmits a notification message to one or more remote computing devices (e.g., client computing device 102), where in some embodiments the notification message includes the image file of the UI that comprises the error condition, and the corresponding error classification assigned to the image file. The notification module 106d then generates a message that is transmitted to, e.g., the client computing device 102 to indicate to a user of the device that an error has occurred. In some embodiments, the notification module 106d stores the UI image file and the error type in database 108, so that developers and testers can later review the information.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automatic classification of error conditions in automated user interface testing, the method comprising:
- receiving, by a server computing device, an image file corresponding to a current user interface view of a software application under test;
- analyzing, by the server computing device, the image file to identify one or more error conditions that exist in the current user interface view, including:
  - as a first error condition, determining that the current user interface view comprises a blank user interface view;
  - as a second error condition:
    - detecting a graphical element in the current user interface view,
    - classifying the detected graphical element based upon at least one of an orientation of the detected graphical element or a shape of the detected graphical element,
    - capturing a portion of the image file that comprises the detected graphical element and a text segment in proximity to the detected graphical element, and
    - analyzing the text segment in the captured portion of the image file to determine an error associated with the text segment;
  - as a third error condition, determining that a header portion of the current user interface view does not include a predefined image;
  - as a fourth error condition, detecting a presence of an empty area in a portion of the current user interface view; and
  - as a fifth error condition, extracting a corpus of text from at least a portion of the current user interface view and analyzing the extracted corpus of text to identify one or more text segments that indicate an error;
- assigning, by the server computing device, a classification to the image file according to one or more error types based upon the one or more error conditions identified in the current user interface view; and
- transmitting, by the server computing device, a notification message to one or more remote computing devices, the notification message comprising the image file and the classification assigned to the image file.

2. The method of claim 1, wherein determining that the current user interface view comprises a blank user interface view comprises:
- generating, by the server computing device, a histogram of color values in the image file; and
- determining, by the server computing device, that the current user interface view comprises a blank user interface view based upon the histogram of color values.

3. The method of claim 1, wherein detecting a graphical element in the current user interface view comprises:
- applying, by the server computing device, a feature extraction algorithm to the image file to detect the graphical element; and
- verifying, by the server computing device, the graphical element once detected by analyzing one or more visual properties of the detected graphical element.

4. The method of claim 3, wherein the feature extraction algorithm is a generalized Hough Transform algorithm.

5. The method of claim 3, wherein the one or more visual properties of the detected graphical element include a location of the detected graphical element and an opacity of the detected graphical element.

6. The method of claim 1, wherein detecting a graphical element in the current user interface view comprises:
- retrieving, by the server computing device, a plurality of template images, wherein each template image corresponds to the graphical element at a different orientation;
- traversing, by the server computing device, the image file using the plurality of template images to generate a plurality of match scores; and
- detecting, by the server computing device, the graphical element using the plurality of match scores.

7. The method of claim 6, wherein traversing the image file using the plurality of template images to generate a plurality of match scores comprises, for each template image:
- aligning, by the server computing device, the template image with a portion of the image file at each of a plurality of different sets of pixel coordinates;
- for each set of coordinates:
  - comparing, by the server computing device, the template image with the portion of the image file at the corresponding set of pixel coordinates, and
  - generating, by the server computing device, a match score for the corresponding set of pixel coordinates based upon the comparison.

8. The method of claim 7, wherein comparing the template image with the portion of the image file at the corresponding set of pixel coordinates comprises:
- comparing, by the server computing device, a value of one or more pixels in the template image to a value of one or more pixels in the portion of the image file at the corresponding set of pixel coordinates.

9. The method of claim 7, wherein detecting the graphical element using the plurality of match scores comprises:
- determining, by the server computing device, a maximum match score of the plurality of match scores; and
- selecting, by the server computing device, the portion of the image file at the set of pixel coordinates that corresponds to the maximum match score.

10. The method of claim 1, wherein capturing a portion of the image file that comprises the detected graphical element and a text segment in proximity to the detected graphical element comprises:
- identifying, by the server computing device, a region of interest in the image file based upon a location of the detected graphical element in the current user interface view; and
- capturing, by the server computing device, the region of interest in the image file as a sub-image.

11. The method of claim 10, wherein analyzing the text segment in the captured portion of the image file to determine an error associated with the text segment comprises:
- extracting, by the server computing device, the text segment from the sub-image; and
- searching, by the server computing device, an error database using the extracted text segment to determine an error associated with the text segment.

12. The method of claim 1, wherein determining that a header portion of the current user interface view does not include a predefined image comprises:

generating, by the server computing device, a histogram of gray values in a portion of the image file corresponding to a header portion of the current user interface view;

comparing, by the server computing device, the histogram of gray values in the portion of the image file to a histogram of gray values in the predefined image; and determining, by the server computing device, that the header portion does not include the predefined image based upon the histogram comparison.

13. The method of claim 1, wherein detecting a presence of an empty area in a portion of the current user interface view comprises:

partitioning, by the server computing device, the image file into a plurality of pixel matrices;

determining, by the server computing device for each pixel matrix, whether all of the pixels in the pixel matrix have a single value; and identifying, by the server computing device, at least one of a size, a shape, or a location of the pixel matrices where all of the pixels have a single value.

14. The method of claim 1, wherein extracting a corpus of text from at least a portion of the current user interface view and analyzing the extracted corpus of text to identify one or more text segments that indicate an error comprises:

identifying, by the server computing device, a body portion of the current user interface view based upon a histogram of gray values in the image file;

capturing, by the server computing device, a portion of the image file corresponding to the body portion of the current user interface view;

removing, by the server computing device, noise from the captured portion of the image file; and extracting, by the server computing device, the corpus of text from the captured portion of the image file using optical character recognition.

15. The method of claim 14, further comprising comparing, by the server computing device, the extracted corpus of text to one or more text segments in an error database to determine that the corpus of text indicates an error.

16. A system for automatic classification of error conditions in automated user interface testing, the system comprising a server computing device with a memory for storing computer-executable instructions and a processor that executes the computer-executable instructions to:

receive an image file corresponding to a current user interface view of a software application under test;

analyze the image file to identify that one or more error conditions exist in the current user interface view, including:

as a first error condition, determining that the current user interface view comprises a blank user interface view;

as a second error condition:

detecting a graphical element in the current user interface view, classifying the detected graphical element based upon at least one of an orientation of the detected graphical element or a shape of the detected graphical element, capturing a portion of the image file that comprises the detected graphical element and a text segment in proximity to the detected graphical element, and analyzing the text segment in the captured portion of the image file to determine an error associated with the text segment;

as a third error condition, determining that a header portion of the current user interface view does not include a predefined image;

as a fourth error condition, detecting a presence of a white area in a portion of the current user interface view; and as a fifth error condition, extracting a corpus of text from at least a portion of the current user interface view and analyzing the extracted corpus of text to identify one or more text segments that indicate an error;

assign a classification to the image file according to one or more error types based upon the one or more error conditions identified in the current user interface view; and transmit a notification message to one or more remote computing devices that comprises the image file and the classification assigned to the image file.

17. The system of claim 16, wherein determining that the current user interface view comprises a blank user interface view comprises:

generating a histogram of gray values in the image file; and determining that the current user interface view comprises a blank user interface view based upon the histogram of gray values.

18. The system of claim 16, wherein detecting a graphical element in the current user interface view comprises:

applying a feature extraction algorithm to the image file to detect the graphical element; and verifying the graphical element once detected by analyzing one or more visual properties of the detected graphical element.

19. The system of claim 18, wherein the feature extraction algorithm is a generalized Hough Transform algorithm.

20. The system of claim 18, wherein the one or more visual properties of the detected graphical element include a location of the detected graphical element and an opacity of the detected graphical element.

21. The system of claim 16, wherein detecting a graphical element in the current user interface view comprises:

retrieving a plurality of template images, wherein each template image corresponds to the graphical element at a different orientation;

traversing the image file using the plurality of template images to generate a plurality of match scores; and detecting the graphical element using the plurality of match scores.

22. The system of claim 21, wherein traversing the image file using the plurality of template images to generate a plurality of match scores comprises, for each template image:

aligning the template image with a portion of the image file at each of a plurality of different sets of pixel coordinates;

for each set of coordinates:

comparing the template image with the portion of the image file at the corresponding set of pixel coordinates, and generating a match score for the corresponding set of pixel coordinates based upon the comparison.

23. The system of claim 22, wherein comparing the template image with the portion of the image file at the corresponding set of pixel coordinates comprises:

comparing a value of one or more pixels in the template image to a value of one or more pixels in the portion of the image file at the corresponding set of pixel coordinates.

24. The system of claim 22, wherein detecting the graphical element using the plurality of match scores comprises:
   determining a maximum match score of the plurality of match scores; and
   selecting the portion of the image file at the set of pixel coordinates that corresponds to the maximum match score.

25. The system of claim 16, wherein capturing a portion of the image file that comprises the detected graphical element and a text segment in proximity to the detected graphical element comprises:
   identifying a region of interest in the image file based upon a location of the detected graphical element in the current user interface view; and
   capturing the region of interest in the image file as a sub-image.

26. The system of claim 25, wherein analyzing the text segment in the captured portion of the image file to determine an error associated with the text segment comprises:
   extracting the text segment from the sub-image; and
   searching an error database using the extracted text segment to determine an error associated with the text segment.

27. The system of claim 16, wherein determining that a header portion of the current user interface view does not include a predefined image comprises:
   generating a histogram of gray values in a portion of the image file corresponding to a header portion of the current user interface view;
   comparing the histogram of gray values in the portion of the image file to a histogram of gray values in the predefined image; and
   determining that the header portion does not include the predefined image based upon the histogram comparison.

28. The system of claim 16, wherein detecting a presence of a white area in a portion of the current user interface view comprises:
   partitioning the image file into a plurality of pixel matrices;
   determining, for each pixel matrix, whether all of the pixels in the pixel matrix have a single color value; and
   identifying at least one of a size, a shape, or a location of the pixel matrices where all of the pixels have a single color value.

29. The system of claim 16, wherein extracting a corpus of text from at least a portion of the current user interface view and analyzing the extracted corpus of text to identify one or more text segments that indicate an error comprises:
   identifying a body portion of the current user interface view based upon a histogram of gray values in the image file;
   capturing a portion of the image file corresponding to the body portion of the current user interface view;
   removing noise from the captured portion of the image file; and
   extracting the corpus of text from the captured portion of the image file using optical character recognition.

30. The system of claim 29, wherein the server computing device compares the extracted corpus of text to one or more text segments in an error database to determine that the corpus of text indicates an error.

* * * * *

UNITED STATES PATENT AND TRADEMARK OFFICE
CERTIFICATE OF CORRECTION

| | | |
|---|---|---|
| PATENT NO. | : 10,963,731 B1 | Page 1 of 1 |
| APPLICATION NO. | : 17/069598 | |
| DATED | : March 30, 2021 | |
| INVENTOR(S) | : Sarker et al. | |

It is certified that error appears in the above-identified patent and that said Letters Patent is hereby corrected as shown below:

On the Title Page

Item (72) Under Inventors section, the inventor "Jensen Joy" should read --Jenson Joy--

Signed and Sealed this
Fifth Day of October, 2021

Drew Hirshfeld
*Performing the Functions and Duties of the
Under Secretary of Commerce for Intellectual Property and
Director of the United States Patent and Trademark Office*